United States Patent [19]

Marécaux

[11] 3,954,381
[45] May 4, 1976

[54] METHOD OF AND APPARATUS FOR INCINERATING AN AQUEOUS SOLUTION CONTAINING NITRO COMPOUNDS

[75] Inventor: Paul Marécaux, Ville d'Avray, France

[73] Assignee: Societe Pour l'Equipement des Industries Chimiques Speichim, Paris, France

[22] Filed: Feb. 25, 1974

[21] Appl. No.: 445,133

[30] Foreign Application Priority Data
Mar. 2, 1973 France ................. 73.07503

[52] U.S. Cl. ........................ 431/2; 110/7 S; 159/4 A; 159/16 R
[51] Int. Cl.² ............................ F23G 7/00
[58] Field of Search ............ 431/2, 4, 190; 110/7, 110/7 B, 7 S; 159/47 WL, 16 A, 16 R, 4 A

[56] References Cited
UNITED STATES PATENTS

| | | | |
|---|---|---|---|
| 2,327,039 | 8/1943 | Heath | 159/4 A |
| 2,524,753 | 10/1950 | Betts | 159/47 WL |
| 2,611,681 | 9/1952 | Bellinger | 159/4 A |
| 3,212,235 | 10/1965 | Markant | 159/4 A |
| 3,212,559 | 10/1965 | Williamson | 159/16 A |
| 3,366,535 | 1/1968 | Cann | 159/4 A |
| 3,387,929 | 6/1968 | Beltz et al. | 159/4 A |
| 3,522,833 | 8/1970 | Mustian et al. | 159/16 A |
| 3,732,911 | 5/1973 | Lowe et al. | 159/16 A |

Primary Examiner—Carroll B. Dority, Jr.
Attorney, Agent, or Firm—Karl F. Ross; Herbert Dubno

[57] ABSTRACT

A concentrated aqueous solution containing nitro compound is incinerated in a chamber to produce a hot dry vapor that is fed through a heat-exchange chamber through which the unconcentrated aqueous solution containing the nitro compounds is dripped so as to evaporate the greater portion of the water in this solution and produce the concentrate that is incinerated. The incineration is carried out at a temperature above 1000°C and the hot vapors leave the heat exchange chamber in a dry state. Thereafter these hot vapors are scrubbed in a tower to remove any particulate material therefrom and are allowed to escape into the atmosphere as a nonpolluting gas.

6 Claims, 1 Drawing Figure

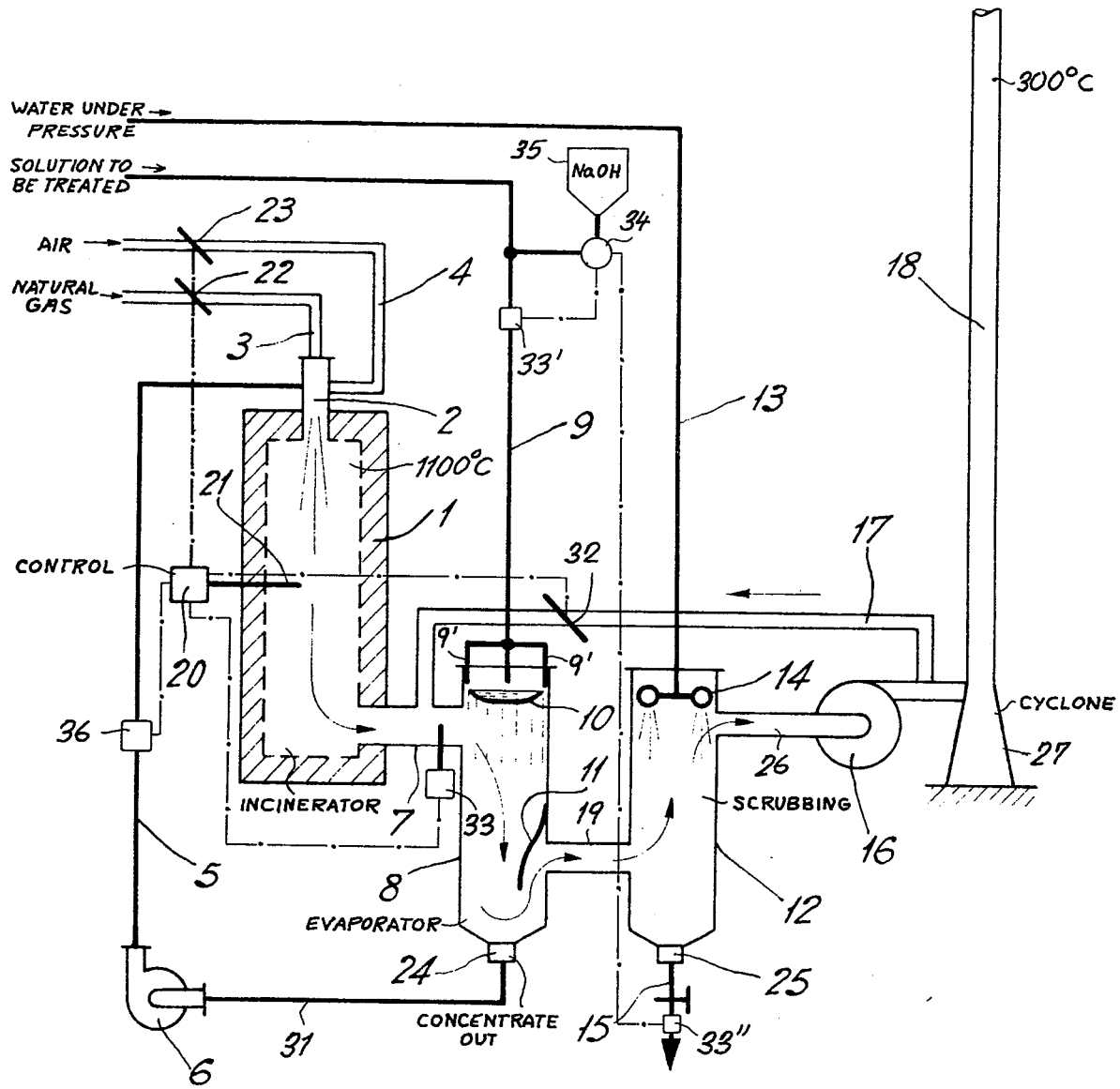

3,954,381

METHOD OF AND APPARATUS FOR INCINERATING AN AQUEOUS SOLUTION CONTAINING NITRO COMPOUNDS

FIELD OF THE INVENTION

The present invention relates to a method of and an apparatus for treating a solution having a thermally reducible fraction. More specifically this invention concerns a process and plant for incinerating waste water or effluent containing components which are capable of being reduced by combustion, such as waste water containing organic and inorganic nitrogen derivatives (e.g. oxides or organic nitrates generally described as nitro compounds) which can be transformed into a mixture of $N_2$, $CO_2$ and $H_2O$.

BACKGROUND OF THE INVENTION

In the production of nitrogen derivatives of benzene, toluene, xylene, phenol, and alkyl-phenols, as in the production of explosives such as TNT (trinitrotoluene), organic compounds are treated with nitric acid. This acid is usually in the form of an aqueous solution containing nitric acid and sulfuric acid. The treatment process produces waste water containing nitric acid, nitrous acid, sulfuric acid, nitrates, nitrites and sulfates, the nitrogen-containing components being generally described below as nitro compounds. The concentration of these solute impurities is relatively low so that their removal presents a considerable difficulty.

These solutes all are thermally reducible by incineration to relatively innocuous substances, such as gaseous nitrogen, water, and carbon dioxide. As long as the combustion is carried out carefully no undesirable materials (soot) or nitrogen oxides are produced. Such a process requires the solution to be incinerated at a temperature of between 1000°C and 1200°C. Since the concentration of these products to be thermally reduced in the solution is relatively low an enormous amount of energy is needed to heat the effluent to this elevated temperature. A method of avoiding this has been to pass the hot dry gas produced by the incineration process through a heat exchanger having a coil through which the solution is passed, so that this solution is raised to a relatively elevated temperature before it even enters the incineration chamber. Such a method, is, however, extremely expensive due to the elevated cost of a thermal heat exchanger usable with a solution containing the various acids and impurities listed above.

OBJECTS OF THE INVENTION

It is therefore an object of the present invention to provide an improved method of and apparatus for treating solutions having a thermally reducible or destructible component.

Another object is the provision of a process and a plant for incinerating waste waters containing nitro compounds.

Yet another object is the provision of such a method which is less expensive than the hitherto known methods both in the consumption of energy and in the equipment cost.

SUMMARY OF THE INVENTION

These objects are attained according to the present invention in a plant having an incineration chamber and a heat exchange chamber connected therewith. The interior of the incineration chamber is heated to temperature sufficient by elevated to thermally reduce the undesirable fraction in the solution and the hot vapors produced in this chamber are conducted through the heat-exchange chamber. The solution is first passed through the direct-contact heat-exchange chamber, contacting the vapors directly so that a portion of the liquid component or the solution is evaporated to produce a concentrate at the bottom of this chamber which not only has a higher concentration of the undesirable fraction, but also is heated to a relatively elevated temperature. This concentrate is then conducted to the incineration chamber where it is vaporized and the dry vapors, containing the thermally reduced undesirable fraction, are used in the heat-exchange chamber.

Thus, according to the present invention, the concentration of the solution as well as its temperature are raised considerably prior to the incineration of this solution. The amount of thermal energy required to incinerate the concentrated solution is a great deal less than that required to heat the unconcentrated solution to the incineration temperature. In addition the thermal energy is used very efficiently so that the gas that ultimately leaves the system is at a low temperature but is dry (i.e. free from condensate).

According to another feature of this invention the vapor as it leaves the heat-exchange chamber is passed through a scrubbing tower where any particles in this vapor are removed.

In accordance with the present invention the solution is contacted in the original heat-exchange chamber directly with the hot and dry vapors coming from the incineration chamber. By "dry" it is here meant that the vapors are at a temperature well above the dewpoint.

In the present case with an aqueous solution containing nitro compounds the hot and the dry vapors have a temperature of about 800°C, having to cool at least 700°C before condensation can occur. The vapor leaves the heat exchanger, which is a trickle tower in which the solution falls in the form of large drops from the top to the bottom, at a temperature still well above the condensation temperature of steam so that the evaporated water exists from the heat-exchange chamber as a dry-gas mixture.

The waste water is contacted with the vapors in a low-energy scrubber, which is in a chamber traversed by the vapors through which the water passes at zero gauge pressure, and falls as drops, streams, or a curtain in the chamber. This low-energy scrubber can be a tower through which the vapors pass in one direction or the other and at whose top the effluent to be evaporated is spilled by means of a spreading element.

Experience has shown that water divided so minimally and dropping only by its weight transfers hardly any thermal energy to the vapor. In particular, fine soluble particles contained in the vapor are not picked up by the dripping water. In other words, the concentrate of the waste water does not become loaded with solubilized particles, which could eventually saturate the concentrated solution.

The mixture of water vapor and dry gases leaving the heat-exchange tower can be expelled directly into the atmosphere, after eventual dry filtration of the solid particles therefrom. Preferably this mixture is treated in a high-energy scrubber, that is by pulverization with high-pressure (several bars) water in order to eliminate the solid particles by transforming them into a solution or suspension. This process actually has two aspects: The drops of water which are moving at high speed strike the fine particles in the mixture and capture them, dissolving them. At the same time the temperature drop inherent in the operation causes water vapor to condense in the mixture, this condensation naturally taking place with the particles as nuclei. Thus the soluble particles, mainly minerals, are transformed into a solution, the others becoming a suspension.

BRIEF DESCRIPTION OF THE DRAWING

The above objects, features, and advantages will become more readily apparent from the following description, reference being made to the accompanying drawing, the sole FIGURE of which is a diagrammatic view of an installation for carrying out the method according to the present invention.

SPECIFIC DESCRIPTION

As shown in the drawing an incineration chamber 1 is provided with a burner 2 which is fed with natural gas through a conduit 3 and with air through a conduit 4 so as to heat the interior of this chamber 1 to a temperature between 1000°C and 1200°C. Vapors produced in chamber 1 pass, as shown by the arrow, through a conduit 7 into an evaporator or trickle tower 8.

A solution to be treated, here an aqueous solution containing toxic nitro compounds, is fed under low pressure via a conduit 9 into the top of the trickle tower 8. A perforated vessel 11 in the top of this trickle tower receives most of the flow from the conduit 9, and branches 9' from the conduit 9 allows the solution to flow down the side walls of the tower 8. Thus the liquid collects in the vessel 10 and falls downwardly in the tower 8 in the form of streams or large drops. The vapors enter the top of tower 8 and leave at the bottom thereof, and pass at a speed approximately the same as the rate at which the solution falls in the chamber, so that the falling streams or drops have virtually zero velocity relating to the vapors and therefore do not tend to pick up particles therefrom.

The conduit 7 opens into the tower 8 well above an outlet conduit 19 which is protected by a deflector 11 so that the gases must pass downwardly through the upwardly elongated tower 8 thereby heating the solution falling from the vessel 10 and trickling down the sidewalls of this evaporator tower 8. This operation causes much of the water phase of the solution to evaporate, thereby producing a concentrate which passes out of the bottom of the chamber 8 through a particle filter 24 and into a conduit 31. A pump 6 in this conduit 31 conducts the concentrate back to the chamber 1 and injects it at the burner 2 so that the concentrate is integrally incinerated, that is its temperature is raised to approximately 1100°C to vaporize the water component completely into hot and dry steam, and to transform the toxic solute component into a nontoxic phase as will be described below.

The evaporated water and other vapors leave the evaporator 8 through a conduit 19 opening into the lower region of a scrubbing tower 12. Water under pressure is fed by a conduit 13 into a spray ring 14 at the upper end of the scrubbing tower 12 which atomizes this water and scrubs the gas rising countercurrent to it from the lower inlet 19 to an upper outlet 26. Any particulate material in this gas will be trapped by the relatively rapidly moving atomized water droplets, and the spray will reduce the temperature of the hot dry gas to such a level that condensation will begin, this condensation naturally using any particulate material carried in the gas as nuclei. The scrubbing water is filtered at 25 and leaves the scrubbing tower 12 through an outlet 15. This water is nontoxic and can be allowed to run into the sewer system.

A blower 16 draws the air out of the outlet 26 of the scrubbing tower 12 and forces it into a cyclone 27 at the bottom of a chimney 18. This cyclone removes any remaining particulate material, so that only hot air, steam and $CO_2$ emerge as gases from tower 18. A shunt conduit 17 extends from the conduit 26 between the blower 16 and the cyclone 27 to the conduit 7. This conduit 17 is provided with a valve 32 which can be operated to allow a certain amount of cool-vapor feedback to the inlet of the evaporator 8. Thus it is possible to control the temperature inside the evaporator according to a thermostat 33 which operates the valve 32. A similar thermostat 21 is connected to a control circuit 20 which serves to operate the valve 32 as well as valve 22 and 23 in the conduits 3 and 4, respectively. A valve 34 in the inlet line 9 may be opened to allow caustic soda in a hopper 35 to be admixed with the water, this additive serving to neutralize particular acids in the solution.

It has been found that it is possible to reduce the consumption of heating gas in such a system by a factor of approximately 5 over a system which simply incinerates the unconcentrated solution. In addition the apparatus is relatively inexpensive because a furnace 1 only a fifth as large as would hitherto be required is needed, and the evaporator 8 is of relatively simple construction and long service life. As a general rule in industrial processes when the size of an element such as a furnace is reduced by a factor of 5 its cost is reduced by a factor of at least 3. In addition the gases ultimately escaping from the chimney 18 have a maximum temperature of between 250° and 350°C, so that there is little pollution.

The control circuit 20 is also connected to a sensor 36 in the conduit 31 which ascertains the concentration of the solute in the concentrate passing through this conduit 31. Thus if the concentration becomes too weak the control circuit 20 opens the valve 22 and 23 to increase the amount of combustibles fed to the burner 2, and thereby raises the temperature inside the oven 1. This will, of course, cause the temperature of the gas leaving the chamber 1 to increase, thereby increasing the amount of evaporation in the chamber 8 and increasing the concentration.

EXAMPLE

Effluent water at a rate of 1000 kg per hour from a plant which produces TNT has the following composition per hour:
Nitric acid 4 kg
Nitrous acid 1 kg
Sulfuric acid 15 kg
Dissolved nitrotoluenes 0.5 kg
Nitrotoluenes in suspension 0.5 kg
Sodium nitrate 1 kg
Sodium nitrite 5 kg
Sodium sulfate 13 kg
Water 960 kg.

This toxic aqueous solution is partially neutralized by the addition of 8.87 kg/hour of caustic soda, sufficient to neutralize the sulfuric acid only in the solution, and taking into account the sodium ions of the nitrates and nitrites. This addition of caustic soda can be effected either by weight according to the amount of water to be treated, or continuously as for example by the use of a pH detector 33' in inlet line 9 or a pH detector as shown at 33'' in the outlet line 15 connected to the control valve 34 feeding sodium hydroxide from the supply 35.

The thus partially neutralized solution is admitted into the evaporator 8 to fill the perforated vessel 10 and to run down the sides of the evaporator. The interior of the chamber 1 is maintained at approximately 1100°C so there is an evaporation of approximately 815 kg/hour of the water, that is approximately 85% by weight of the incoming water. The remaining 185 kg/hour of the solution is thus heated to 88°C and is injected into the burner 2 which received 56 kg/hour of natural gas and combustion air. The combustion temperature is as mentioned above regulated to be approximately 1200°C. Thus the vapors, which are completely dry as they leave the evaporator 8, contain in addition to $CO_2$, $H_2O$, $N_2$, and air, all of the sodium being in the form of sodium sulfate. All of the sodium sulfate is removed from vapor in the tower 12 at a rate of 34.74 kg/hour.

Analysis of the vapors leaving the chimney 18 indicates that they contain no sulfurous anhydride ($SO_2$), and less than 5 parts per million of nitrogen oxide. The waters leaving the scrubbing chamber 12 at 15 carry only sodium sulfate which can be recovered or simply discarded.

In order to incinerate 1000 kg per hour of this solution according to prior art methods, that is by directly incinerating the unconcentrated solution, 356 kg/hour of natural gas would be necessary, that is 6.3 times more than is necessary according to the present invention.

I claim:

1. A method of incinerating an aqueous solution containing a toxic nitro compound solute which comprises the following steps:
    a. incinerating by combustion with a fuel-air mixture a concentrated liquid containing the toxic solute at a temperature of substantially 1000 to 1200°C to form a hot, dry, detoxified vapor from said liquid;
    b. passing said hot, dry, detoxified vapor into heat exchange with a trickle of said aqueous solution to concentrate said solution and form more of said liquid while carrying away water by evaporation; and
    c. feeding said liquid from step (b) to step (a).

2. The method defined in claim 1 wherein said solution is directly contacted with said vapor by being dripped through said vapor.

3. The method defined in claim 2, further comprising the step of scrubbing said dry gas mixture.

4. The method defined in claim 3 wherein said mixture is scrubbed with a spray of finely divided water under pressure.

5. A method of incinerating an aqueous solution containing both a toxic nitro compound solute and acid not destructible by conventional incineration which comprises the following steps:
    a. incinerating by combustion with a fuel-air mixture a concentrated liquid containing the toxic solute, the acid, and an acid neutralization agent at a temperature of substantially 1000° to 1200°C to form a hot, dry, detoxified vapor from said liquid;
    b. adding the acid neutralization agent to the aqueous solution containing both a toxic nitro compound and acid;
    c. passing said hot, dry detoxified vapor into heat exchange with a trickle of aqueous solution containing the toxic solute, the acid and the acid neutralization agent; and
    d. feeding said liquid from step (c) to step (a).

6. The method defined in claim 5, step (a) wherein the nondestructible acid is neutralized by addition of caustic soda at a rate of 8.87 kg/hr.

* * * * *